(12) United States Patent
Nakano et al.

(10) Patent No.: US 7,593,810 B2
(45) Date of Patent: Sep. 22, 2009

(54) INTERACTIVE ROUTE GUIDE DEVICE

(75) Inventors: Nobuyuki Nakano, Osaka (JP); Ryotaro Iwami, Hyogo (JP); Tomohiro Terada, Osaka (JP); Takeshi Takahashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 585 days.

(21) Appl. No.: 10/584,624

(22) PCT Filed: Feb. 21, 2005

(86) PCT No.: PCT/JP2005/002703

§ 371 (c)(1),
(2), (4) Date: Jun. 26, 2006

(87) PCT Pub. No.: WO2005/085760

PCT Pub. Date: Sep. 15, 2005

(65) Prior Publication Data

US 2009/0143970 A1 Jun. 4, 2009

(30) Foreign Application Priority Data

Mar. 8, 2004 (JP) .............................. 2004-064820

(51) Int. Cl.
*G08G 1/0969* (2006.01)
*G01C 21/00* (2006.01)

(52) U.S. Cl. ...................... 701/200; 701/201; 701/210; 340/995.23

(58) Field of Classification Search .................. 701/200, 701/201, 210, 212; 340/995.19, 995.21, 340/995.23
See application file for complete search history.

(56) References Cited

U.S. PATENT DOCUMENTS

| | | | | |
|---|---|---|---|---|
| 5,410,486 A | * | 4/1995 | Kishi et al. | 701/211 |
| 5,809,447 A | * | 9/1998 | Kato et al. | 701/211 |
| 5,872,301 A | * | 2/1999 | Schlosser et al. | 568/647 |
| 6,217,687 B1 | * | 4/2001 | Shibata et al. | 156/82 |
| 6,317,687 B1 | | 11/2001 | Morimoto et al. | |
| 6,321,160 B1 | * | 11/2001 | Takahashi | 701/209 |
| 6,339,746 B1 | | 1/2002 | Sugiyama et al. | |
| 7,379,876 B2 | * | 5/2008 | Nakata | 704/275 |

FOREIGN PATENT DOCUMENTS

| | | |
|---|---|---|
| JP | 8-254437 | 10/1996 |
| JP | 2001-165693 | 6/2001 |
| JP | 2002-56110 | 2/2002 |

* cited by examiner

*Primary Examiner*—Tan Q Nguyen
(74) *Attorney, Agent, or Firm*—Wenderoth, Lind & Ponack, L.L.P.

(57) ABSTRACT

An interactive route guide device capable of providing an appropriate amount of information with an appropriate timing in accordance with a user's desire. In the interactive route guide device, a storage device stores at least one table which defines a type of guide information to be provided for a route from a departure point to a destination point. An arithmetic processing unit generates the guide information according to the table in the storage device, and an output device outputs the generated guide information. The user uses an input device to input a guide request. The arithmetic processing unit manages at least a content of the inputted guide request and the number of times the guide request is inputted, and edits the table stored in the storage device in accordance with the content of the inputted guide request and the number of times the guide request is inputted.

9 Claims, 15 Drawing Sheets

FIG. 3

| ELEMENT NUMBER | PHRASE |
|---|---|
| 1 | ONSEI ANNAI WO |
| 2 | KAISHI SHIMASU |
| 3 | SHUURYOU SHIMASU |
| 4 | OYOSO |
| 5 | KONOSAKI |
| 6 | MAMONAKU |
| 7 | 5KM DE |
| 8 | 2KM DE |
| 9 | 1KM DE |
| 10 | 700M DE |
| 11 | 500M DE |
| 12 | 300M DE |
| 13 | MEJIRUSHI |
| 14 | MOKUTEKICHI |
| 15 | SOUKOU KYORI WA |
| 16 | SHOYOU JIKAN WA |
| 17 | RYOUKIN WA |
| 18 | DESU |
| 19 | KM |
| 20 | M |
| 21 | JIKAN |
| 22 | HUN |
| 23 | EN |
| 24 | ATO |
| 25 | HAI |
| 26 | IIE |
| ... | ... |
| 101 | HIDARI NANAME ZENPOU |
| 102 | HIDARI HOUKOU |
| 103 | HIDARI NANAME KOUHOU |
| 104 | U TAAN HOUKOU |
| 105 | MIGI NANAME KOUHOU |
| 106 | MIGI HOUKOU |
| 107 | MIGI NANAME ZENPOU |
| ... | ... |
| 201 | KONBINIENSU SUTOA GA |
| 202 | GASORIN SUTANDO GA |
| ... | ... |
| 210 | FAMIRII RESUTORAN GA |
| ... | ... |

22

| ELEMENT NUMBER | PHRASE |
|---|---|
| 301 | 100000 |
| 302 | 90000 |
| ... | ... |
| ... | ... |
| ... | 10000 |
| ... | 9000 |
| ... | ... |
| ... | 1000 |
| ... | 900 |
| ... | ... |
| ... | 100 |
| ... | 90 |
| ... | ... |
| 345 | 10 |
| ... | 9 |
| ... | ... |
| 346 | 1 |
| ... | ... |
| 1001 | A KOUSA TEN WO |
| 1002 | B CHOU WO |
| 1003 | C DOORI WO |
| ... | ... |

FIG. 4A

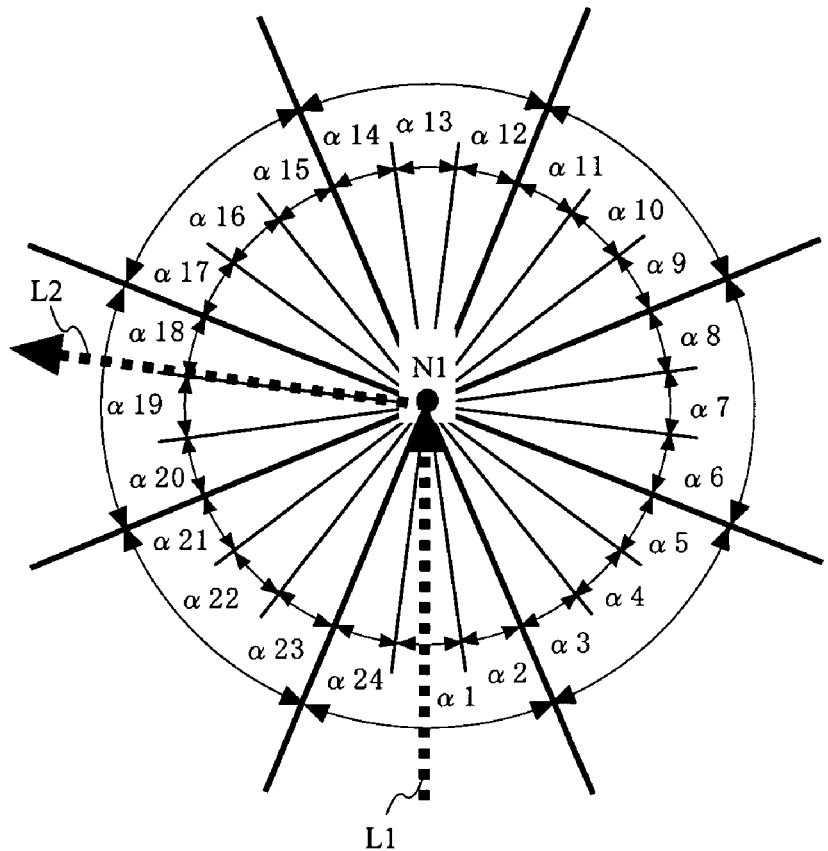

FIG. 4B

| GUIDE DIRECTION TABLE | |
|---|---|
| ANGULAR RANGE | GUIDE DIRECTION |
| α12-α14 | CHOKUSHIN HOUKOU (STRAIGHTFORWARD) (NO GUIDANCE) |
| α15-α17 | HIDARI NANAME ZENPOU (DIAGONALLY FORWARD LEFT) |
| α18-α20 | HIDARI HOUKOU (LEFT) |
| α21-α23 | HIDARI NANAME KOUHOU (DIAGONALLY BACKWARD LEFT) |
| α24, α1, α2 | U TAAN HOUKOU (U-TURN DIRECTION) |
| α3-α5 | MIGI NANAME KOUHOU (DIAGONALLY BACKWARD RIGHT) |
| α6-α8 | MIGI HOUKOU (RIGHT) |
| α9-α11 | MIGI NANAME ZENPOU (DIAGONALLY FORWARD RIGHT) |

FIG. 5

| GUIDE TIMING TABLE | 24 |
|---|---|
| AT THE START OF ROUTE GUIDANCE |
| 700M BEFORE GUIDE OBJECT INTERSECTION |
| 300M BEFORE GUIDE OBJECT INTERSECTION |
| 100M BEFORE GUIDE OBJECT INTERSECTION |
| 2KM BEFORE DESTINATION POINT |
| 1KM BEFORE DESTINATION POINT |
| 100M BEFORE DESTINATION POINT |

| GUIDE CONTENTS TABLE | | | | | | |
|---|---|---|---|---|---|---|
| GUIDE TIMING | | ELEMENT NUMBER (REPRODUCED FROM LEFT TO RIGHT) | | | | |
| AT THE START OF ROUTE GUIDANCE | | 1 | 2 | | | |
| BEFORE GUIDE OBJECT INTERSECTION | 700m | 4 | 10 | *j | 18 | |
| | 300m | 4 | 12 | *j | 18 | |
| | 100m | 5 | *j | 18 | | |
| BEFORE DESTINATION POINT | 2km | 4 | 8 | 14 | 18 | |
| | 1km | 4 | 9 | 14 | 18 | |
| | 100m | 6 | 14 | 18 | 1 | 3 |

FIG. 7

| REQUEST MANAGEMENT TABLE | | | 26 |
|---|---|---|---|
| CONTENT OF GUIDE REQUEST | INPUT TIMING | NUMBER OF TIMES OF INPUT | |
| "MEJIRUSHI WA? (WHAT IS THE LANDMARK?)" | — | N1 | |
| "KOUSA TEN NO NAMAE WA? (WHAT IS THE NAME OF THE INTERSECTION?)" | — | N2 | |
| "SHOYOU JIKAN WA? (HOW LONG DOES IT TAKE?)" | AT THE START OF ROUTE GUIDANCE | N3 | |
| | AFTER THE START OF ROUTE GUIDANCE | N4 | |
| "KYORI WA? (HOW FAR IS IT?)" | AT THE START OF ROUTE GUIDANCE | N5 | |
| | AFTER THE START OF ROUTE GUIDANCE | N6 | |
| "KOKO? (IS IT HERE?)" | JUST BEFORE NON-GUIDE OBJECT INTERSECTION | N7 | |
| | JUST BEFORE GUIDE OBJECT INTERSECTION | N8 | |

FIG. 8

| RESPONSE CONTENTS TABLE | | | | | | 27 |
|---|---|---|---|---|---|---|
| CONTENT OF GUIDE REQUEST | INPUT TIMING | ELEMENT NUMBER | | | | |
| "MEJIRUSHI WA? (WHAT IS THE LANDMARK?)" | — | *k | 13 | 18 | | |
| "KOUSA TEN NO NAMAE WA? (WHAT IS THE NAME OF THE INTERSECTION?)" | — | *m | 18 | | | |
| "SHOYOU JIKAN WA? (HOW LONG DOES IT TAKE?)" | AT THE START OF ROUTE GUIDANCE | 16 | 4 | *n | 22 | 18 |
| | AFTER THE START OF ROUTE GUIDANCE | 24 | 4 | *n | 22 | 18 |
| "KYORI WA? (HOW FAR IS IT?)" | AT THE START OF ROUTE GUIDANCE | 15 | 4 | *s | 19 | 18 |
| | AFTER THE START OF ROUTE GUIDANCE | 24 | 4 | *s | 19 | 18 |
| "KOKO? (IS IT HERE?)" | — | *p | | | | |

F I G. 9
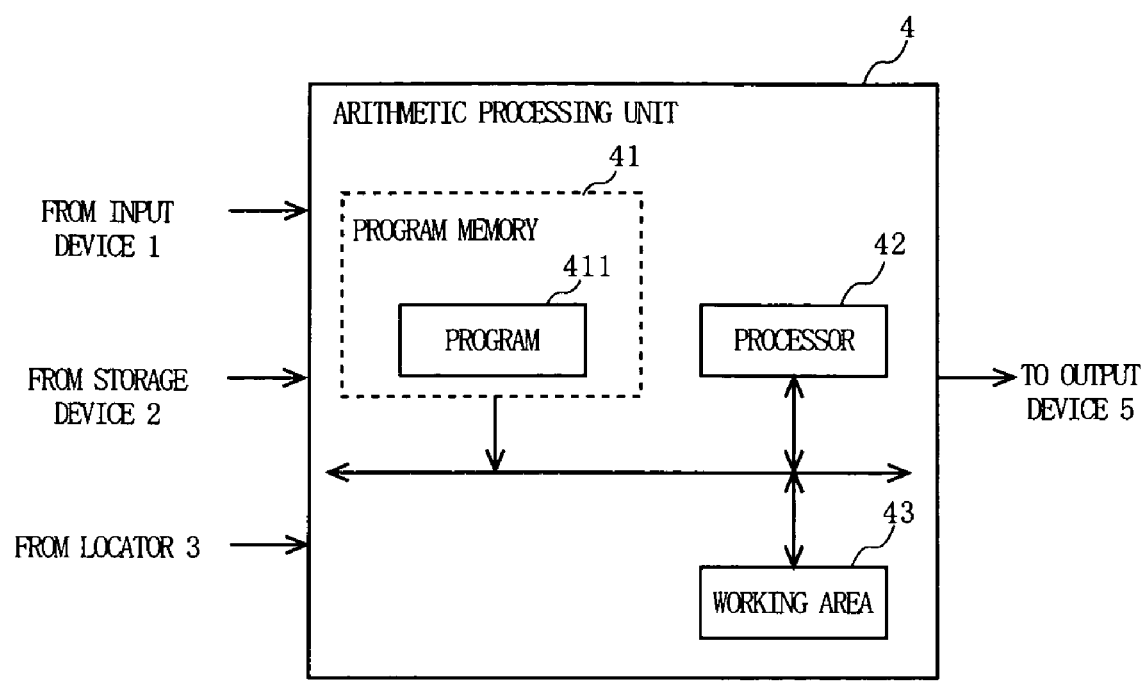

FIG. 12

| GUIDE CONTENTS TABLE {25} |||||||
|---|---|---|---|---|---|---|
| GUIDE TIMING | ELEMENT NUMBER (REPRODUCED FROM LEFT TO RIGHT) ||||||
| AT THE START OF ROUTE GUIDANCE | 1 | 2 | | | | |
| BEFORE GUIDE OBJECT INTERSECTION | 700m | 4 | 10 | *j | 18 | *q | 13 | 18 |
| | 300m | 4 | 12 | *j | 18 | *q | 13 | 18 |
| | 100m | 5 | *j | 18 | *q | 13 | 18 | |
| BEFORE DESTINATION POINT | 2km | 4 | 8 | 14 | 18 | | |
| | 1km | 4 | 9 | 14 | 18 | | |
| | 100m | 6 | 14 | 18 | 1 | 3 | |

FIG. 13

| GUIDE CONTENTS TABLE {25} |||||||
|---|---|---|---|---|---|---|
| GUIDE TIMING | ELEMENT NUMBER (REPRODUCED FROM LEFT TO RIGHT) ||||||
| AT THE START OF ROUTE GUIDANCE | 1 | 2 | | | | |
| BEFORE GUIDE OBJECT INTERSECTION | 700m | 4 | 10 | *r | *j | 18 |
| | 300m | 4 | 12 | *r | *j | 18 |
| | 100m | 5 | *r | *j | 18 | |
| BEFORE DESTINATION POINT | 2km | 4 | 8 | 14 | 18 | |
| | 1km | 4 | 9 | 14 | 18 | |
| | 100m | 6 | 14 | 18 | 1 | 3 |

FIG. 14

| GUIDE CONTENTS TABLE | | | | | | | | | |
|---|---|---|---|---|---|---|---|---|---|
| GUIDE TIMING | | ELEMENT NUMBER (REPRODUCED FROM LEFT TO RIGHT) | | | | | | | |
| AT THE START OF ROUTE GUIDANCE | | 1 | 2 | 15 | *s | 19 | 16 | *n | 22 | 18 |
| BEFORE GUIDE OBJECT INTERSECTION | 700m | 4 | 10 | *j | 18 | | | | | |
| | 300m | 4 | 12 | *j | 18 | | | | | |
| | 100m | 5 | *j | 18 | | | | | | |
| BEFORE DESTINATION POINT | 2km | 4 | 8 | 14 | 18 | | | | | |
| | 1km | 4 | 9 | 14 | 18 | | | | | |
| | 100m | 6 | 14 | 18 | 1 | 3 | | | | |

FIG. 15A

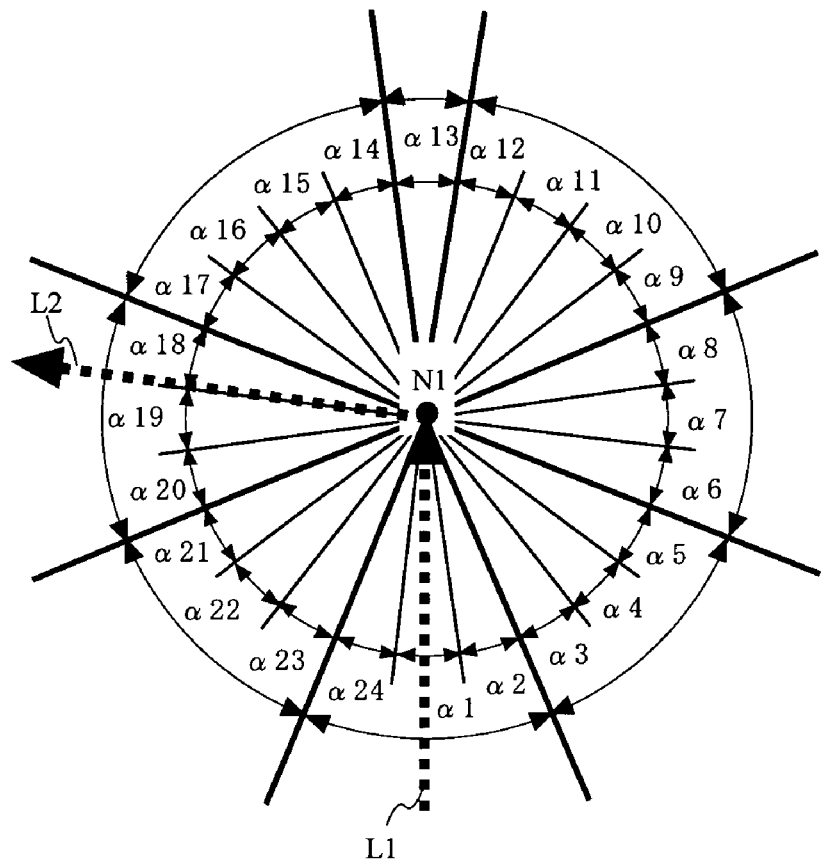

FIG. 15B

| GUIDE DIRECTION TABLE ||
| --- | --- |
| ANGULAR RANGE | GUIDE DIRECTION |
| α13 | CHOKUSHIN HOUKOU (STRAIGHTFORWARD) (NO GUIDANCE) |
| α14- α17 | HIDARI NANAME ZENPOU (DIAGONALLY FORWARD LEFT) |
| α18- α20 | HIDARI HOUKOU (LEFT) |
| α21- α23 | HIDARI NANAME KOUHOU (DIAGONALLY BACKWARD LEFT) |
| α24, α1, α2 | U TAAN HOUKOU (U-TURN DIRECTION) |
| α3- α5 | MIGI NANAME KOUHOU (DIAGONALLY BACKWARD RIGHT) |
| α6- α8 | MIGI HOUKOU (RIGHT) |
| α9- α12 | MIGI NANAME ZENPOU MIGI (DIAGONALLY FORWARD RIGHT) |

FIG. 16

| |
|---|
| GUIDE TIMING TABLE |
| AT THE START OF ROUTE GUIDANCE |
| 700M BEFORE GUIDE OBJECT INTERSECTION |
| 300M BEFORE GUIDE OBJECT INTERSECTION |
| 100M BEFORE GUIDE OBJECT INTERSECTION |
| 2KM BEFORE DESTINATION POINT |
| 1KM BEFORE DESTINATION POINT |
| 100M BEFORE DESTINATION POINT |
| 40M BEFORE GUIDE OBJECT INTERSECTION |

| GUIDE CONTENTS TABLE | | | | | | |
|---|---|---|---|---|---|---|
| GUIDE TIMING | | ELEMENT NUMBER (REPRODUCED FROM LEFT TO RIGHT) | | | | |
| AT THE START OF ROUTE GUIDANCE | | 1 | 2 | | | |
| BEFORE GUIDE OBJECT INTERSECTION | 700m | 4 | 10 | *j | 18 | |
| | 300m | 4 | 12 | *j | 18 | |
| | 100m | 5 | *j | 18 | | |
| | 40m | *j | 18 | | | |
| BEFORE DESTINATION POINT | 2km | 4 | 8 | 14 | 18 | |
| | 1km | 4 | 9 | 14 | 18 | |
| | 100m | 6 | 14 | 18 | 1 | 3 |

25

INTERACTIVE ROUTE GUIDE DEVICE

BACKGROUND OF THE INVENTION

1. Technical Field

The present invention relates to an interactive route guide device, and particularly to a route guide device that interactively provides guide information for a user.

2. Background Art

In recent years, the number of vehicles equipped with a navigation system has been increasing. A general navigation system searches for a route for a vehicle from a departure point to a destination point by using digital map data stored in a storage medium such as a CD (Compact Disc), DVD (Digital Versatile Disc) or a hard disc. Then, the navigation system provides guides with respect to a route which is found. While such guides are provided, in accordance with a predetermined fixed rule (hereinafter, referred to as a guide rule), the general navigation system, for example, determines a content of guide information to be provided for guiding the vehicle and/or a timing of providing the guide information, and displays various graphic information on a display screen, and also outputs voice information from a speaker.

One of the navigation systems providing guides as described above is a route guide device described below which is capable of interactively providing guide information (hereinafter, referred to as a conventional route guide device). The conventional route guide device not only unilaterally provides guide information for a user in accordance with the aforementioned fixed guide rule, but also outputs guide information in response to a request from the user. To be specific, the user requests, by manual input and/or voice input, the conventional route guide device to output guide information. In response to the request, the conventional route guide device selects guide information comprising a remaining travel distance to a destination point, a landmark object and a travel direction, and then provides the selected guide information for the user (Refer to, e.g., Japanese Laid-Open Patent Publication No. 8-254437).

However, it can be considered that there is a tendency for guide information needed by each user to vary to some extent depending on each user's personality. For this reason, there is a problem that a user sometimes cannot obtain, from the conventional route guide device, an appropriate amount of guide information having an appropriate content for the user.

There is also another problem that a user gets annoyed since the conventional route guide device requires the user to operate the device before providing guide information. To be specific, as described above, there is a tendency for guide information needed by each user to vary depending on each user's personality, and the conventional route guide device requires a user to repeatedly operate the device in a same manner in similar situations. For example, if a user tends to request guide information at 100 m before passing an intersection, the user is required to operate the conventional route guide device at 100 m before proceeding into a first intersection, and the user is again required to operate the device at 100 m before proceeding into a next intersection.

Therefore, an object of the present invention is to provide an interactive route guide device that is capable of providing, in accordance with a tendency of a user, an appropriate amount of guide information having an appropriate content with an appropriate timing.

SUMMARY OF THE INVENTION

In order to achieve the above object, a first aspect of the present invention is directed to the interactive route guide device. The interactive route guide device comprises: a storage unit operable to store at least one table which defines a type of guide information to be provided for a route from a departure point to a destination point; a guide information generating unit operable to generate guide information in accordance with the table in the storage unit; an output unit operable to output the guide information generated in the guide information generating unit; an input unit which a user operates in order to request guide information; a request management unit operable to manage a content of a request inputted into the input unit and a number of times the request is inputted; and an editing unit operable to edit the table, which is stored in the storage unit, in accordance with the content and the number of times, which are managed by the request management unit.

The storage unit stores the table in which a timing of providing the guide information is written, and the editing unit changes the timing, which is written in the table, in accordance with the content and the number of times, which are managed by the request management unit.

The storage unit stores the table in which guide directions from an intersection, for which the guide information should be provided, are written, and the editing unit changes the guide directions, which are written in the table, in accordance with the content and the number of times, which are managed by the request management unit.

The storage unit stores the table, in which a content of the guide information is defined, and the editing unit changes the content of the guide information, which is defined in the table, in accordance with the content and the number of times, which are managed by the request management unit.

For example, the editing unit changes the content and an amount of the guide information for each time. The editing unit also changes a frequency of generating the guide information.

A second aspect of the present invention is directed to an interactive route guide method. The interactive route guide method comprises: a guide information generating step of generating guide information in accordance with at least one table which defines a type of guide information to be provided for a route from a departure point to a destination point; an output step of outputting the guide information generated at the guide information generating step; a request management step of retaining a content of a request inputted by a user and a number of times the request is inputted; and an editing step of editing the table in accordance with the content and the number of times, which are retained at the request management step.

A third aspect of the present invention is directed to a computer program for realizing interactive route guide. The computer program comprises: a guide information generating step of generating guide information in accordance with at least one table which defines a type of guide information to be provided for a route from a departure point to a destination point; an output step of outputting the guide information generated at the guide information generating step; a request management step of retaining a content of a request inputted by a user and a number of times the request is inputted; and an editing step of editing the table in accordance with the content and the number of times, which are retained at the request management step.

The computer program is recorded in a recording medium.

EFFECT OF THE INVENTION

In the above aspects, the table is edited based on a content of a request from a user and the number of times the user inputs the request. In other words, the table is edited in accordance with a tendency of an individual user. According to the above aspects, guide information is generated based on such a table, and this makes it possible to provide guide information whose amount and content correspond to a user's tendency.

The above and other objects, features, aspects and advantages of the present invention will become more apparent when the following detailed description of the present invention is understood with reference to the accompanying drawings.

BRIEF DESCRIPTION OF THE DRAWINGS

FIG. 3 is a schematic diagram showing an exemplary data structure of an element DB 22 shown in FIG. 2.

FIG. 4A is a first schematic diagram showing an area surrounding a node N1 which is an object intersection.

FIG. 4B is a schematic diagram showing an exemplary data structure and exemplary contents of a guide direction table 23 (in an initial state) shown in FIG. 2.

FIG. 5 is a schematic diagram showing an exemplary data structure and exemplary contents of a guide timing table 24 (in an initial state) shown in FIG. 2.

FIG. 6 is a schematic diagram showing an exemplary data structure and exemplary contents of a guide contents table 25 (in an initial state) shown in FIG. 2.

FIG. 7 is a schematic diagram showing an exemplary data structure and exemplary contents of a request management table 26 shown in FIG. 2.

FIG. 8 is a schematic diagram showing an exemplary data structure and exemplary contents of a response contents table 27 (in an initial state) shown in FIG. 2.

FIG. 9 is a schematic diagram showing an exemplary hardware structure of an arithmetic processing unit 4 shown in FIG. 1.

FIG. 12 is a schematic diagram of the guide contents table 25 edited at step 522 of FIG. 11.

FIG. 13 is a schematic diagram of the guide contents table 25 edited at step 524 of FIG. 11.

FIG. 14 is a schematic diagram of the guide contents table 25 edited at step 526 of FIG. 11.

FIG. 15A is a second schematic diagram showing the area surrounding the node N1 which is the object intersection.

FIG. 15B is a schematic diagram of the guide direction table 23 edited at step S28 of FIG. 11.

FIG. 16 is a schematic diagram showing the guide timing table 24 edited at step S210 of FIG. 11.

FIG. 17 is a schematic diagram showing the guide contents table 25 edited at step S210 of FIG. 11.

Figure 1:
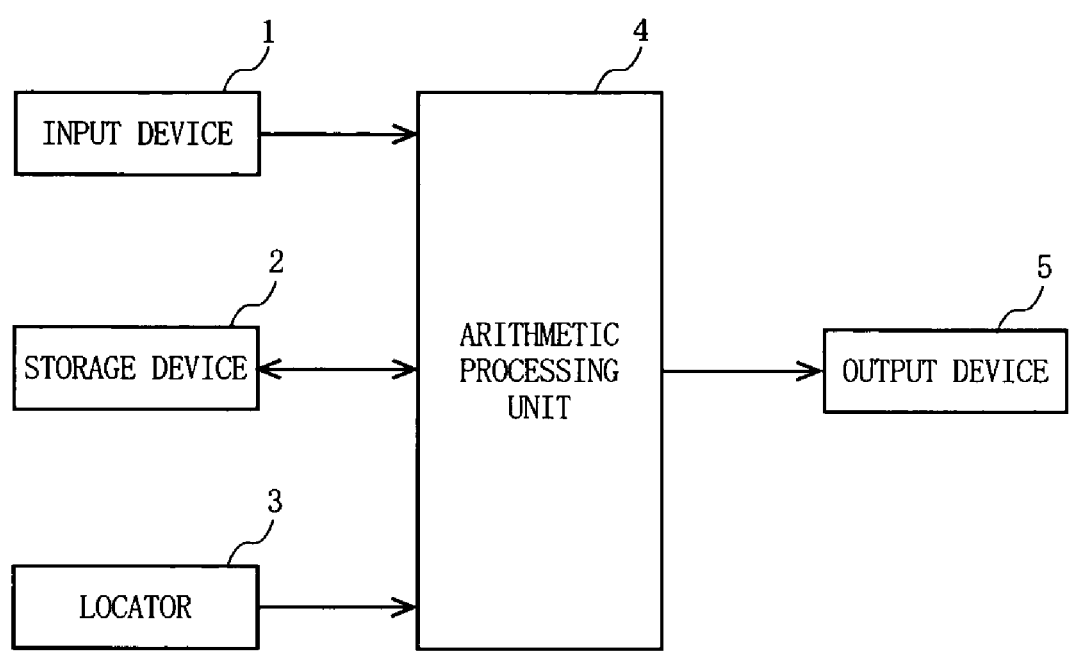
FIG. 1 is a block diagram showing a structure of an interactive route guide device according to an embodiment of the present invention.

DESCRIPTION OF THE REFERENCE CHARACTERS 1 input device
2 storage device
3 locator
4 arithmetic processing unit
5 output device

DETAILED DESCRIPTION OF THE INVENTION

FIG. 1 is a block diagram showing a structure of an interactive route guide device (hereinafter in the present embodiment, referred to as a "route guide device") according to an embodiment of the present invention. FIG. 1 shows the route guide device, which is mounted on, for example, an in-vehicle navigation system and comprises an input device 1, a storage device 2, a locator 3, an arithmetic processing unit 4 and an output device 5.

The input device 1 is a device that a user operates in order to input various information into the route guide device. In the present embodiment, the input device 1 includes a microphone. A user inputs, by voice, requests for various guides into the microphone.

Preferably, the storage device 2 writes data on a storage medium which is rewritable and nonvolatile, and reads data from the storage medium.

Figure 2:
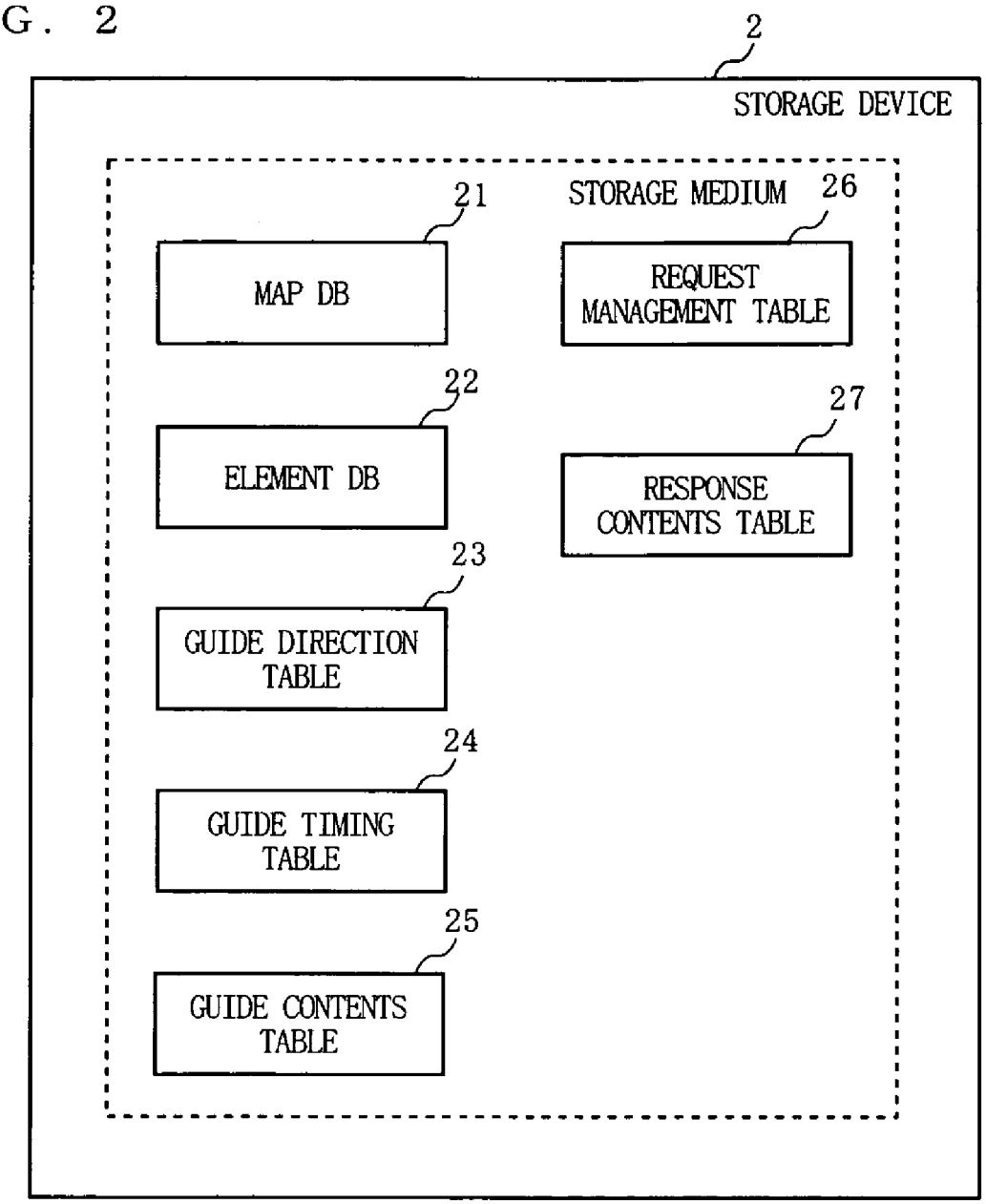
FIG. 2 is a schematic diagram showing typical data recorded in a storage medium of a storage device 2 shown in FIG. 1.

FIG. 2 is a schematic diagram showing typical data stored in the storage medium of the storage device 2. In FIG. 2, a map database (hereinafter, referred to as a map DB) 21, an element database (hereinafter, referred to as an element DB) 22, a guide direction table 23, an guide timing table 24, a guide contents table 25, a request management table 26 and a response contents table 27 are stored in the storage medium.

The map DB 21 may be a known database, and includes at least nodes and links which represent connection relations between roads existing within a predetermined range. The node typically represents by coordinate values a feature point on a road such as an intersection, an bending point or a dead end. The link represents a road segment between two feature points adjoining each other.

The element DB 22 includes essential elements for generating guide information. FIG. 3 is a schematic diagram showing an exemplary data structure of the element DB 22. In FIG. 3, a guide DB 11 illustratively includes a substantial number of phrases. The phrases are examples of the aforementioned elements, and are segments of voice presenting the guide information. FIG. 3 shows examples of the phrases such as adverbs (e.g., "oyoso (approximately)" and "mamonaku (soon)"), phrases showing travel directions (e.g., "migi houkou (right)" and "hidari naname zenpou (diagonally forward left)"), phrases showing values (e.g., "10000" and "900") and phrases showing proper nouns (e.g., "A kousa ten wo (A intersection)" and "B chou wo (town B)"). An element number that does not overlap any other element number is allocated to each phrase.

In the guide direction table 23, a travel direction of a vehicle from an intersection that is an object of the guide information (i.e., guide direction) is defined (hereinafter, such an intersection is referred to as an "object intersection"). FIG. 4A is a schematic diagram showing an area surrounding a node N1 which is an object intersection. FIG. 4A shows the node N1 and a link L1. The node N1 represents an object intersection into which a vehicle is going to proceed. The link L1 represents a road segment on which the vehicle is currently traveling, and the link L1 is connected to the node N1. FIG. 4A further shows angular ranges α1 to α24 which are obtained by dividing, while using a proceeding direction of the vehicle as a reference angle, a 360-degree area around the node N1 into 24 angular ranges, the area having the node N1 as a center. Here, it is assumed that a proceeding vector of the vehicle is a reference angle (e.g., 0°) and that the angle increases in an anticlockwise direction. Under this assumption, the angular range α1 is 352.5°<a≦+7.5°. An angular range α1 is obtained by rotating forward an angular range α (i−1) by 30° centering around the node N1. Here, i is any natural number between 2 to 24. Note that, according to the design specification of the route guide device, the area surrounding the node N1 may be discretionarily divided into any number of angular ranges other than the 24 angular ranges.

Here, eight directions, i.e., straightforward, diagonally forward left, left, diagonally backward left, U-turn direction, diagonally backward right, right and diagonally forward right are set as the guide directions for a vehicle by using the node N1 and the link L1 as reference points. In an initial state, the angular ranges α12 to α14 are allocated to the straight forward direction. If a direction of a road segment on which a vehicle travels immediately after passing through an object intersection is within the angular ranges α12 and α14, that means the vehicle passes straight through the object intersection. In such a case, the route guide device determines that guide information is not necessary, and does not provide any guide information for a user. Also, in the initial state, the angular ranges α15 to α17 are allocated to the diagonally forward left direction; the angular ranges α18 to α20 are allocated to the left direction; and the angular ranges α21 to α23 are allocated to the diagonally backward left direction. Further, four sets of three angular ranges, which are respectively symmetric, with respect to the node N1, to the four sets of three angular ranges allocated to the straightforward direction, the diagonally forward left direction, the left direction and the diagonally backward left direction, are allocated to the U-turn direction, the diagonally backward right direction, the right direction and the diagonally forward right direction, respectively.

FIG. 4A further shows a link L2 representing a road segment on which the vehicle travels immediately after passing through the node N1. If the link 2 is included in the angular range α18, the route guide device generates guide information for guiding the vehicle to the left direction.

FIG. 4B is a schematic diagram showing an exemplary data structure and exemplary contents of the guide direction table 23 in the case where the route guide device is in the initial state. In the guide direction table 23 of FIG. 4B, the angular ranges respectively allocated to the guide directions are written. To be specific, when the route guide device is in the initial state, the angular ranges a 12 to a 14 are allocated to chokushin houkou (straightforward); the angular ranges α15 to α17 are allocated to hidari naname zenpou (diagonally forward left); the angular ranges α18 to α20 are allocated to hidati houkou (left); the angular ranges α21 to α23 are allocated to hidari naname kouhou (diagonally backward left); the angular ranges α24, α1 and α2 are allocated to U taan houkou (U-turn direction); and the angular ranges α3 to α5, the angular ranges α6 to α8 and the angular ranges α9 to α11 are allocated to migi naname kouhou (diagonally backward right), migi houkou (right) and migi naname zenpou (diagonally forward right), respectively. Note that, the angular ranges a respectively allocated to the guide directions may be otherwise rewritten by the arithmetic processing unit 4 in accordance with a user's tendency.

Refer to FIG. 2 again. In the guide timing table 24, when or at which point the guide information is to be provided for the vehicle is defined. FIG. 5 is a schematic diagram showing an exemplary data structure and exemplary contents of the guide timing table 24 in the initial state. In the guide timing table 24 of FIG. 5, exemplary timings to provide guidance, i.e., guide timings are written, e.g., "at the start of route guiding", "at a point which is 700 m before an object intersection", "at a point which is 300 m before an object intersection", "at a point which is 100 m before an object intersection", "at a point which is 2 km before a destination point", "at a point which is 1 km before a destination point" and "at a point which is 100 m before a destination point". As described later, the guide timing table 24 may be rewritten by the arithmetic processing unit 4 in accordance with a user's tendency.

Refer to FIG. 2 again. In the guide contents table 25, a content of each guide information, which is provided at a corresponding one of the aforementioned guide timings, is defined. FIG. 6 is a schematic diagram showing an exemplary data structure and exemplary contents of the guide contents table 25 in the initial state. When the guide timings are defined as above, seven sets of contents of guide information are defined in the guide contents table 25. As described later, the guide contents table 25 may also be rewritten by the arithmetic processing unit 4.

To be specific, guide information whose content is "onsei annai wo kaishi shimasu (Voice guiding starts now)" is provided at the start of route guiding. In order to provide such guide information, element numbers 1 and 2 are written in the guide contents table 25. In other words, the route guide device provides the guide information "onsei annai wo kaishi shimasu (Voice guiding starts now)" by sequentially outputting phrases that are specified by the element numbers 1 and 2.

The element numbers 4, 10, *j and 18 are written for the guide timing "at a point which is 700 m before an object intersection". Here, *j indicates an element number representing a guide direction which the arithmetic processing unit 4 has determined by referring to the guide direction table 23 of FIG. 4B. Since the aforementioned guide directions are written in the guide direction table 23, *j is any number selected from element numbers 101 to 107. Accordingly, at a point which is 700 m before an object intersection, guide information whose content is "oyoso 700 m de XX desu (In approximately 700 m, turn XX)" is provided (XX is a direction specified by *j). Element numbers selected in the same manner are written also for each of the guide timings "at a point which is 300 m before an object intersection" and "at a point which is 100 m before an object intersection".

In addition, element numbers 4, 8, 14 and 18 are written for the guide timing "at a point which is 2 km before a destination point". Based on this, at a point which is 2 km before a destination point, guide information whose content is "oyoso 2 km de mokutekichi desu (The destination point is approximately 2 km ahead)" is provided. Element numbers selected in the same manner are written also for each of the guide timings "at a point which is 1 km before a destination point" and "at a point which is 100 m before a destination point".

Refer to FIG. 2 again. The request management table 26 is a table for recording the number of times each guide request is inputted from the input device 1. FIG. 7 is a schematic diagram showing an exemplary data structure and exemplary contents of the request management table 26. In the request management table 26 of FIG. 7, at least a content of each guide request and the number of times each guide request is inputted are recorded. An input timing may also be recorded regarding some guide requests. A guide request may be a request for reoutputting immediately-previous guide information which has been outputted. Another guide request may be a request for outputting guide information which is different from the immediately-previous guide information having been outputted. Further another guide request may be a request made by a user when no guide information has been outputted. Contents of the guide requests in the present embodiment are, for example, "mejirushi wa? (What is the landmark?)", "kousa ten no namae wa? (What is the name of the intersection?)", "shoyou jikan wa? (How longdoes it take?)", "kyoriwa? (How far is it?)" and "koko? (Is it here?)".

In the request management table 26, the number of times of input "N1" is recorded for the guide request "mejirushi wa? (What is the landmark?)". Here, N1 is a variable representing the number of times a user has asked "mejirushi wa? (What is the landmark?)". The number of times of input "N2" is recorded for the guide request "kousa ten no namae wa? (What is the name of the intersection?)". N2 is a variable representing the number of times a user has asked "kousa ten no namae wa? (What is the name of the intersection?)". In addition to an input timing "at the start of route guiding" and the number of times of input "N3", an input timing "after the start of route guiding" and the number of times of input "N4" are recorded for the guide request "shoyou jikan wa? (How long does it take?)". N3 and N4 are also variables. To be specific, N3 is the number of times a user has asked "shoyou jikan wa? (How long does it take?)" at the start of route guiding, and N4 is the number of times the user has asked the same question after the start of route guiding. In addition to the input timing "at the start of route guiding" and the number of times of input "N5", the input timing "after the start of route guiding" and the number of times of input "N6" are recorded for the guide request "kyori wa? (How far is it?)". N5 and N6 are variables. To be specific, N5 is the number of times a user has asked "kyori wa? (How far is it?)" at the start of route guiding, and N6 is the number of times the user has asked the same question after the start of route guiding. For the guide request "koko? (Is it here?)", a combination of an input timing "at a point which is just before a non-object intersection" and the number of times of input "N7" and a combination of an input timing "at a point which is just before an object intersection" and the number of times of input "N8" are recorded. N7 is a variable representing the number of times a user has asked "koko? (Is it here?)" at a point which is just before a non-object intersection, and N8 is a variable representing the number of times the user has asked the same question at a point which is just before an object intersection.

Refer to FIG. 2 again. In the response contents table 27, a content of each response, which is to be provided corresponding to one of the aforementioned guide requests, is defined. As will hereinafter be described in detail, the response contents table 27 may also be rewritten by the arithmetic processing unit 4. FIG. 8 is a schematic diagram showing an exemplary data structure and exemplary contents of the response contents table 27 in the initial state. When the guide requests are as described above (Refer to FIG. 7), element numbers *k, 13 and 18 are written in the table for the guide request "mejirushi wa? (What is the landmark?)". Here, *k indicates an element number representing a noun (i.e., landmark) selected by the arithmetic processing unit 4. Assuming that nouns representing objects to be landmarks are allocated to element numbers 201 to 210 in the element DB 22 (Refer to FIG. 3), *k is any number selected from the element numbers 201 to 210. Accordingly, when a user asks "mejirushi wa? (What is the landmark?)", the route guide device provides guide information whose response content is "XX ga mejirushi desu (XX is a landmark)".

Also, element numbers *m and 18 are written in the table for the guide request "kousa ten no namae wa? (What is the name of the intersection?)". Here, *m indicates an element number representing the name of an intersection selected by the arithmetic processing unit 4 (e.g., element number 1001). Accordingly, when a user asks "kousa ten no namae wa? (What is the name of the intersection?)", the route guide device replies "XX kousa ten desu (It is XX intersection)".

In addition, a combination of element numbers 16, 4, *n, 22 and 18, and a combination of element numbers 24, 4, *n, 22 and 18 are written for "shoyou jikan wa? (How long does it take?)". The former combination of the element numbers is allocated to the input timing "at the start of route guiding", and the latter combination is allocated to the input timing "after the start of route guiding". Here, *n indicates an element number (e.g., element number 345) representing a travel time calculated by the arithmetic processing unit 4. Based on these combinations, if a user asks "shoyou jikan wa? (How long does it take?)" at the start of route guiding, the route guide device replies, for example, "shoyou jikan wa oyoso XX hun desu (Travel time is approximately XX minutes)", and if the user asks the same question after the start of route guiding, the route guide device replies, for example, "nokori oyoso XX hun desu (Remaining travel time is approximately XX minutes)". Element numbers selected in the same manner are written also for "kyori wa? (How far is it?)".

Further, an element number *p is written for "koko? (Is it here?)". Here, *p represents either an element number 25 or an element number 26.

Refer to FIG. 1 again. The locator 3 typically includes an antenna and a receiver for receiving information from a positioning system such as GPS (Global Positioning System), and also includes an autonomous navigation sensor that typically includes a speed sensor and a gyro sensor. The antenna and the receiver of the GPS calculate an absolute position of a vehicle on the ground by using information which is transmitted from an artificial satellite and stored in the positioning system. The velocity sensor and the gyro sensor mounted on the vehicle detect a traveling speed and a direction change of the vehicle. The locator 3 may include either a combination of the antenna and receiver or the autonomous navigation sensor.

The arithmetic processing unit 4 processes various data by using data stored in the storage device 2, an output signal from the input device 1 and an output signal from the locator 3.

FIG. 9 is a schematic diagram showing an exemplary hardware structure of the arithmetic processing unit 4. In FIG. 9, the arithmetic processing unit 4 includes a program memory 41, a processor 42 and a working area 43. The program memory 41 is typically an ROM (Read Only Memory), and stores a computer program 411 (hereinafter, referred to as a program). Operation details of the arithmetic processing unit 4 are written in the program 411 as a main portion of the program 411. The processor 42 executes the above program 411. The working area 43 is typically an RAM (Random Access Memory), and is used to enable the processor 42 to execute the program 411.

Refer to FIG. 1 again. The output device 5 includes a display device and/or a speaker. The display device displays various information generated by the arithmetic processing unit 4, and the speaker outputs the various information, which is generated by the arithmetic processing unit 4, in the form of voice.

Figure 10A:
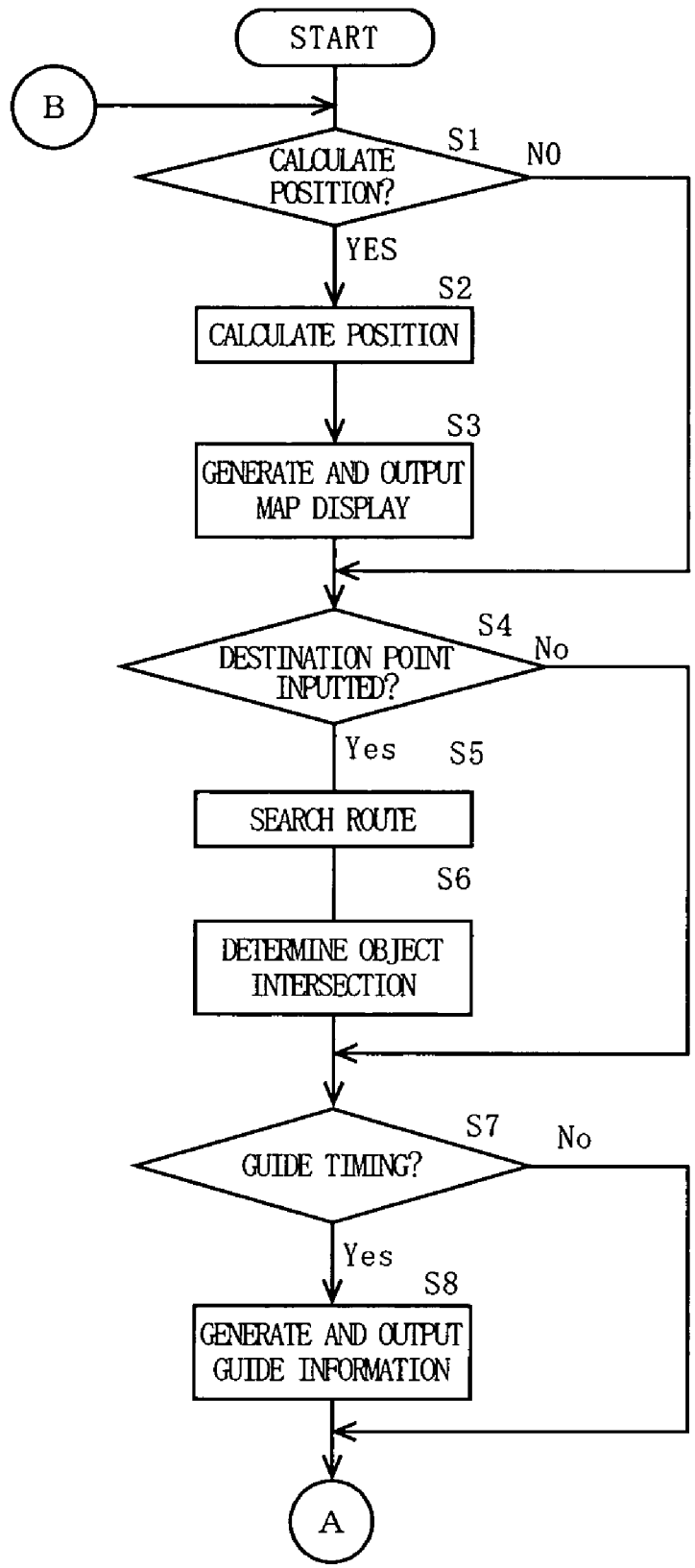
FIG. 10A is a first half of a flow chart showing processes performed by the interactive route guide device shown in FIG. 1.

Next, an operation of the route guide device will be described with reference to flow charts of FIGS. 10A and 10B. In FIG. 10, the processor 42 performs initialization after the route guide device starts up, and then performs various processes in accordance with the program 411 by using the working area 43. After step S1, the processor 42 determines whether a current position of a vehicle should be calculated (FIG. 10A; step S1). The current position is calculated at predetermined regular time intervals, for example, every second. When the processor 42 determines "YES" at step S1, the processor 42 then calculates the current position by using the output signal from the locator 3 (step S2). Thereafter, the processor 42 uses the map DB 21 to generate a map image of an area surrounding the current position. The generated map image is transferred to the display device of the output device 5, and the display device outputs the map image received (step S3).

After step S3, or when the processor 42 determines "NO" at step S1, the processor 42 then determines whether a destination point has been received from the input device 1 (step S4). When the processor 42 determines "Yes" at step S4, the processor 42 then searches for, in accordance with a known algorithm, a route from a departure point to the destination point by using the map DB 21 (step S5). Here, a route which is found contains at least a node string. Note that, a point sent from the input device 1 or the current position of the vehicle may be used as the departure point.

Next, the processor 42 selects, from the node string contained in the route having been found, an intersection regarding which guide information should be provided (object intersection) (step S6). As described above, it is assumed in the present embodiment that guide information is not provided regarding an intersection which a vehicle passes straight through. Therefore, at step S6, an intersection that is not in the straightforward direction, which is one of the above-described guide directions, is determined as an object intersection.

After step S6, or when the processor 42 determines "No" at step S4, the processor 42 then determines whether a current moment is a guide timing (step S7). To be specific, the processor 42 determines whether the current moment is one of the timings defined in the guide timing table 24 or whether the current position obtained at step S2 is one of the positions defined in the guide timing table 24.

When the processor 42 determines "Yes" at step S7, the processor 42 then obtains, from the guide contents table 25, element numbers currently required. The processor 42 further obtains, from the element DB 22, a combination of phrases whose numbers are the same as the element numbers having been obtained. Thereafter, the processor 42 joins the obtained phrases together to generate guide information whose guide content is presented in the form of voice.

In the case where the guide timings are defined as shown in FIG. 5, guide information whose content is "onsei annai wo kaishi shimasu (Voice guiding starts now)" is generated at the start of route guiding. When the current position is at, for example, 700 m, 300 m or 100 m before an object intersection, the processor 42 calculates which one of the angular ranges a shown in FIG. 4A includes an escape link from an object intersection, and then determines a guide direction. According to the guide direction determined, the processor 42 obtains, from the element DB 22, a phrase which is appropriate as *j shown in FIG. 6. Accordingly, when a position of a vehicle is, for example, at 700 m before the object intersection, and a guide direction is determined as migi houkou (right), guide information whose content is "oyoso 700 m de migi houkou desu (In approximately 700 m, turn right)" is provided. Also, when the current position of the vehicle is at, for example, 2 km before a destination point, guide information whose content is "oyoso 2 km de mokutekichi desu (The destination point is approximately 2 km ahead)" is generated.

The guide information generated as described above is transferred from the arithmetic processing unit 4 to the output device 5, and the speaker of the output device 5 outputs voice in accordance with the guide information received (step S8).

Figure 10B:
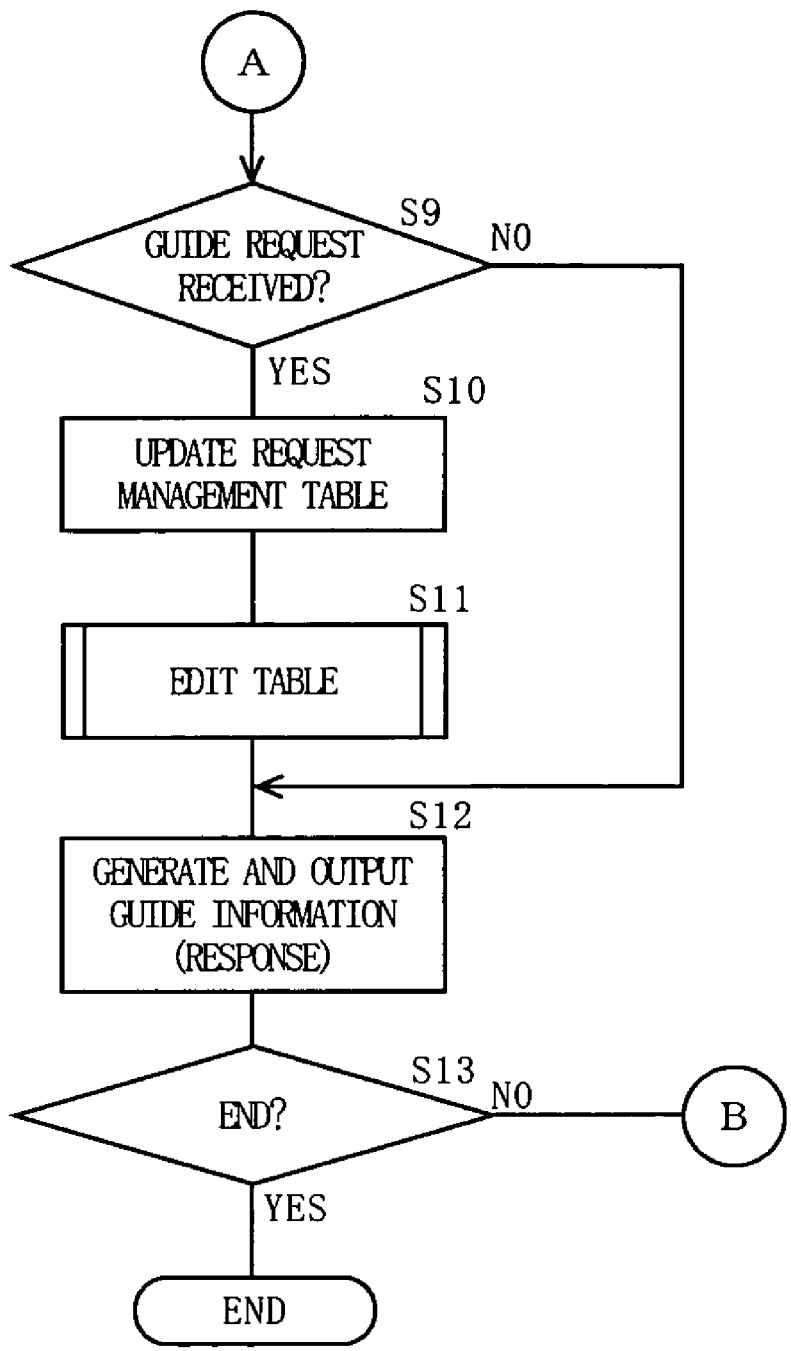
FIG. 10B is a second half of the flow chart showing the processes performed by the interactive route guide device shown in FIG. 1.

After step S8, or when the processor 42 determines "No" at step S7, the processor 42 then determines whether a guide request has been received from the input device 1 (FIG. 10B; step S9). In the present embodiment, exemplary requests shown in FIG. 7 are defined as the guide requests.

In the present embodiment, in order to provide more convenience for a user, a user can input, by voice, a guide request to the route guide device. When the voice of the user is inputted into the microphone of the input device 1, the microphone generates a voice signal indicating the inputted voice of the user, and gives the signal to the arithmetic processing unit 4. In the arithmetic processing unit 4, if the inputted voice is any of the above described guide requests, the processor 42 determines "YES" at step S9 by using a known voice recognition algorithm.

When the processor 42 determines as above, the processor 42 then updates the request management table 26 (step S10). To be specific, in the request management table 26, the processor 42 increments, by 1, the number of times a current guide request is inputted. When "mejirushi wa? (What is the landmark?)" is asked, N1 of the request management table 26 is incremented by 1. Similarly, when the other guide request is made, one of the numbers of times of input N2 to N8, which corresponds to the guide request, is incremented by 1.

Then, the processor 42 edits each type of table while referring to the request management table 26, which has been updated (step S11).

Figure 11:
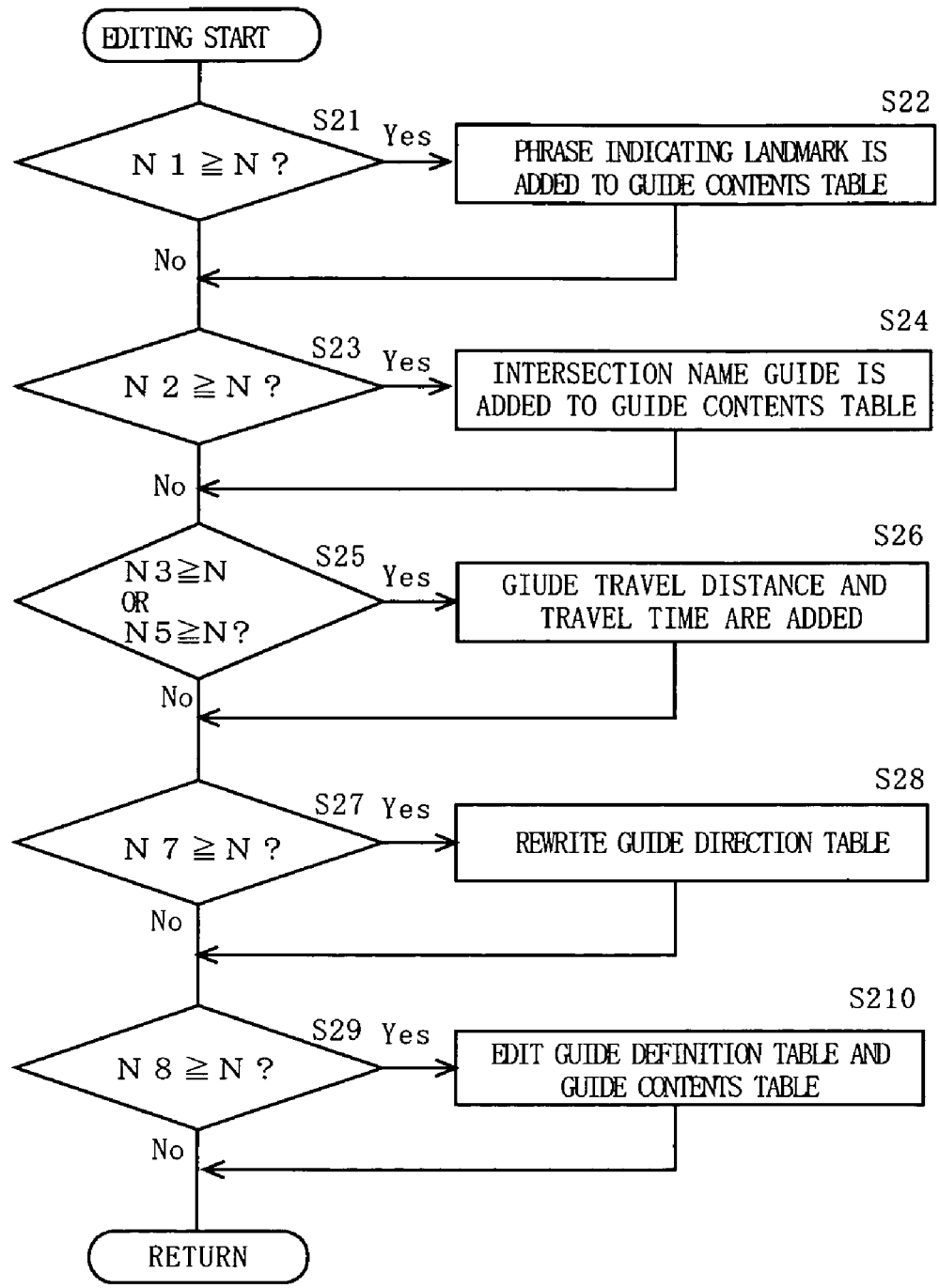
FIG. 11 is a flow chart showing a detailed process of step S11 shown in FIG. 10B.

FIG. 11 is a flow chart showing a process of step S11 in detail. In FIG. 11, the processor 42 determines whether the number of times of input "N1" has become equal or above a standard value N (step S21). When the processor 42 determines "Yes", the processor 42 then determines that the user tends to need a landmark as guide information regarding an object intersection, and then adds, to the guide contents table 25, an element number that specifies a necessary phrase for outputting a landmark (step 522). To be specific, for example, as shown within a bold-line frame in FIG. 12, element numbers *q, 13 and 18 are added for each of the guide timings "at a point which is 700 m before an object intersection", "at a point which is 300 m before an object intersection" and "at a point which is 100 m before an object intersection". Here, *q indicates an element number allocated to a phrase indicating a landmark. In the element DB 22 of the present embodiment, phrases such as "konbiniensu sutoa ga (a convenience store)", "gasorin sutando ga (a gas station)", "famirii resutoran ga (a family restaurant)" and so on, which indicate things which can be used as landmarks, are written. Therefore, *q is one or more numbers selected from the element numbers 201 to 210. Accordingly, for example, at a point which is 700 m before an object intersection, guide information whose content is "mejirushi ha konbiniensu sutoa desu (A landmark is a convenience store)" other than "oyoso 700 m de XX desu (In approximately 700 m, turn XX)" is provided. The element numbers selected in the same manner are added also for each of the guide timings "at a point which is 300 m before an object intersection" and "at a point which is 100 m before an object intersection".

After step 522, or when the processor 42 determines "NO" at step S21, the processor 42 then determines whether the number of times of input "N2" has become equal or above the standard value N (step S23). When the processor 42 determines "YES" at step S23, the processor 42 then determines that the user tends to need the name of an object intersection, and adds, to the guide contents table 25, an element number that specifies a necessary phrase for outputting the name of an intersection (step 524). To be specific, for example, as shown within a bold-line frame in FIG. 13, an element number *r is added just before *j for each of the guide timings "at a point which is 700 m before an object intersection", "at a point which is 300 m before an object intersection" and "at a point which is 100 m before an object intersection". Here, *r indicates an element number allocated to a phrase indicating the name of an intersection. In the element DB 22 of the present embodiment, a phrase "A kousa ten wo (A intersection)", which indicates an intersection, is shown as an example. Therefore, *r is an element number 1001. Accordingly, for example, at a point which is 700 m before an object intersection, guide information whose content is "oyoso 700 m de A kousa ten wo XX houkou desu (In approximately 700 m, turn XX at A intersection)" is provided. The element number selected in the same manner is added also for each of the guide timings "at a point which is 300 m before an object intersection" and "at a point which is 100 m before an object intersection".

After step S24, or when the processor 42 determines "NO" at step S23, the processor 42 then determines whether the number of times of input "N3" or the number of times of input "N5" has become equal or above the standard value N (step S25). When the processor 42 determines "YES" at step S25, the processor 42 then determines that the user tends to need, at the start of route guiding, a travel distance and a travel time, and then adds, in the guide contents table 25, to guide information which is defined to be outputted at the start of route guiding, element numbers that specify necessary phrases for outputting a travel distance and a travel time (step S26). To be specific, as shown within a bold-line frame in FIG. 14, element numbers 15, *n, 19, 16, *s, 22 and 18 are added for the guide timing "at the start of route guiding". Here, *n and *s are as described above. Accordingly, for example, at the start of route guiding, guide information whose content is "onsei annai wo kaishi shimasu (Voice guiding starts now), soukou kyori wa 15 km desu (The travel distance is 15 km), shoyou j ikan wa 15 hun desu (The travel time is 15 minutes)" is provided.

After step S26, or when the processor 42 determines "NO" at step S25, the processor 42 then determines whether the number of times of input "N7" has become equal or above the standard value N (step S27). When the processor 42 determines "YES" at step S27, as will be described in further detail below, the processor 42 then rewrites the guide direction table 23 (step S28). As described above, the number of times of input "N7" represents the number of times a user has asked "koko? (Is it here?)" just before a non-object intersection. The fact that N7 is such a high value indicates that the user thinks a vehicle should not pass straight through the intersection although the route guide device does not determine the intersection as a guide object intersection since the route guide device considers that the vehicle should pass straight through the intersection. Then, as shown in FIGS. 15A and 15B, in the guide direction table 23, the processor 42 expands, by one range to the straightforward direction, the angular ranges allocated to the diagonally forward left direction and the diagonally forward right direction, respectively. As a result, for example, even if an escape link L2 is included in the angular range α14, guide information whose content is "oyoso 700 m de A kousaten wo hidari naname zenpou desu (In approximately 700 m, turn diagonally forward left at A intersection)" is outputted.

After step S28, or when the processor 42 determines "NO" at step S27, the processor 42 then determines whether the number of times of input "N8" has become equal or above the standard value N (step S29). When the processor 42 determines "YES" at step S29, the processor 42 then determines that the user is unconfident about identifying which intersection is an object intersection, and edits the guide timing table 24 and the guide contents table 25 (step S210). To be specific, as shown in FIG. 16, the processor 42 adds, to the guide timing table 24, a new distance from an object intersection (e.g., 40 m as shown in FIG. 16) as a new guide timing in addition to the guide timings which have already been defined. As shown within a bold-line frame in FIG. 17, the processor 42 further adds, to the guide contents table 25, the newly-added guide timing along with element numbers *j and 18. A guide information content is thus added for the newly-added guide timing. This allows guide information whose content is "hidari houkou desu (turn left)" to be provided at a point which is 40 m before the object intersection.

After step S210, or when the processor 42 determines "NO" at step S29, the processor 42 then completes the editing process shown in FIG. 11, and performs step S12 of FIG. 10B.

At step S12, in accordance with a content and an input timing of a guide request, the processor 42 obtains, from the response contents table 27, element numbers currently required. Further, in the same manner as the described process at step S8, the processor 42 joins together phrases obtained from the element DB 22 to generate guide information whose response content is presented in the form of voice.

Thereafter, the processor 42 determines whether or not to terminate the processing shown in FIGS. 10A and 10B (step S13). When the processor 42 determines "NO", the processor 42 then performs step S1 shown in FIG. 10A. When the processor 42 determines "YES", the processor 42 then terminates the processing.

As described above, the interactive route guide device has the input device 1 allowing a user to input a guide request. The arithmetic processing unit 4 manages, by using the request management table 26, at least a content of a guide request from the user and the number of times the guide request is inputted. Further, the arithmetic processing unit 4 refers to the request management table 26, and if the number of times the guide request with the same content has been inputted becomes equal or above the standard value N, the arithmetic processing unit 4 edits the tables 23, 24, 25 and 27, which are in the storage device 2. The arithmetic processing unit 4 generates guide information by using the tables 23, 24, 25 and 27, which are thus edited. This allows the interactive route guide device to provide the user with an appropriate amount of guide information having an appropriate content with an appropriate timing.

Note that, although the present embodiment has been described assuming that the input device 1 is a microphone, the present invention is not limited thereto. For example, a user may input a guide request by operating a manual input device such as a remote controller.

As described in the above embodiment, since the tables 23 to 27 are updated and edited by the arithmetic processing unit 4, the storage device 2 includes a storage medium that is rewritable and nonvolatile, and it is also described as a matter of convenience that the map DB 21 and the element DB 22 are also stored in the storage device 2. However, the map DB 21 and the element DB 22 do not necessarily have to be stored in the storage device 2, and may be stored in a different read-only storage device.

Figure 18:
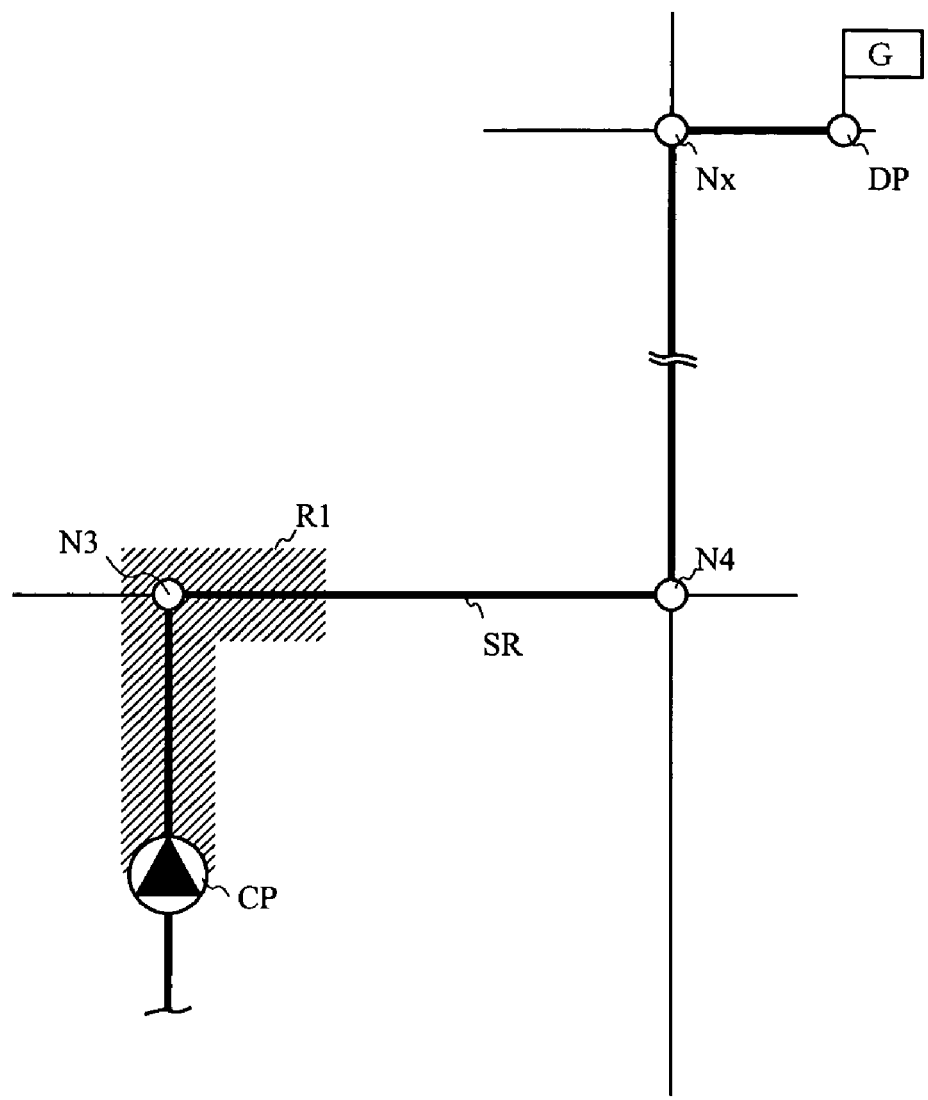
FIG. 18 is a schematic diagram showing an alternative example of a process at step 56 of FIG. 10A.

As described in the above embodiment, at step S6, the processor 42 selects all object intersections from a route which has been found, but not limited thereto, as shown in FIG. 18, from a route SR having been found (denoted by a bold line), the processor 42 may select, as an object intersection, an intersection included within a predetermined range R1 that is in the direction of a destination point DP, by using a current position CP as a reference point. However, in this case, the processor 42 is required to select, every time an object intersection ceases being present in the predetermined range R1, an object intersection from intersections included within a next range R1.

As described above in the embodiment, the processor 42 adds data to the tables. However, for example, the processor 42 may also delete, from the tables, data of a guide request that is not frequently inputted.

In the process of FIG. 11 of the above embodiment, only one standard value N is used, but not limited thereto, different standard values may be prepared for N1, N2, N3, N5, N7 and N8, respectively. It is desired that each of these standard values, which corresponds to one of the guide request contents or one of the combinations of a guide request content and an input timing thereof, is separately set.

At step S25 of FIG. 11 of the above embodiment, the processor 42 determines whether N3 or N5 is equal or above the standard value N, but not limited thereto, the processor 42 may add, to the guide contents table, as a guide content, a travel distance if N3 is equal or above the standard value N, and add a travel time if N5 is equal or above the standard value N.

As described in the above embodiment, the program 411 is stored in the program memory 41, but not limited thereto, the program 411 may be stored in a storage medium typified by a CD-ROM to be distributed, or may be distributed via a network.

While the present invention has been described in detail, the foregoing description is illustrative and not restrictive in all aspects. It is understood that numerous other modifications and variations are possible without departing from the scope of the present invention.

INDUSTRIAL APPLICABILITY

The interactive route guide device according to the present invention is useful for a system such as an in-vehicle navigation system that is required to have a particular technical effect, i.e., providing a user with an appropriate amount of guide information with an appropriate timing in accordance with a tendency of the user.

The invention claimed is:

1. An interactive route guide device comprising:
a storage unit operable to store at least one table which defines a type of guide information to be provided for a route from a departure point to a destination point;
a guide information generating unit operable to generate guide information in accordance with the table in the storage unit;
an output unit operable to output the guide information generated in the guide information generating unit;
an input unit which a user operates in order to request guide information;
a request management unit operable to manage a content of a request inputted into the input unit and a number of times the request is inputted; and
an editing unit operable to edit the table, which is stored in the storage unit, to add additional information to the guide information to be provided for the route in accordance with the content of the request inputted and the number of times the request is inputted, which are managed by the request management unit.

2. The interactive route guide device according to claim 1, wherein
the storage unit stores the table in which a timing of providing the guide information is written; and
the editing unit changes the timing, which is written in the table, in accordance with the content and the number of times, which are managed by the request management unit.

3. The interactive route guide device according to claim 1, wherein
the storage unit stores the table in which guide directions from an intersection, for which the guide information should be provided, are written; and
the editing unit changes the guide directions, which are written in the table, in accordance with the content and the number of times, which are managed by the request management unit.

4. The interactive route guide device according to claim 1, wherein
the storage unit stores the table, in which a content of the guide information is defined; and
the editing unit changes the content of the guide information, which is defined in the table, in accordance with the content and the number of times, which are managed by the request management unit.

5. The interactive route guide device according to claim 1, wherein the editing unit changes an amount of the content of the guide information for each time.

6. The interactive route guide device according to claim 1, wherein the editing unit changes a frequency of generating the guide information.

7. An interactive route guide method comprising:
a guide information generating step of generating guide information in accordance with at least one table which defines a type of guide information to be provided for a route from a departure point to a destination point;
an output step of outputting the guide information generated at the guide information generating step;
a request management step of retaining a content of a request inputted by a user and a number of times the request is inputted; and
an editing step of editing the table to add additional information to the guide information to be provided for the route in accordance with the content of the request inputted and the number of times the request is inputted, which are retained at the request management step.

8. A computer program stored on a computer-readable medium for realizing interactive route guide, comprising:
a guide information generating step of generating guide information in accordance with at least one table which defines a type of guide information to be provided for a route from a departure point to a destination point is;
an output step of outputting the guide information generated at the guide information generating step;
a request management step of retaining a content of a request inputted by a user and a number of times the request is inputted; and
an editing step of editing the table to add additional information to the guide in formation to be provided for the route in accordance with the content of the request inputted and the number of times the request is inputted, which are retained at the request management step.

9. The computer program according to claim 8 recorded in a recording medium.

* * * * *